A. J. BORST, Jr.
STEAM GENERATOR AND SUPERHEATER.
APPLICATION FILED APR. 4, 1917.
1,376,509.
Patented May 3, 1921.
3 SHEETS—SHEET 1.
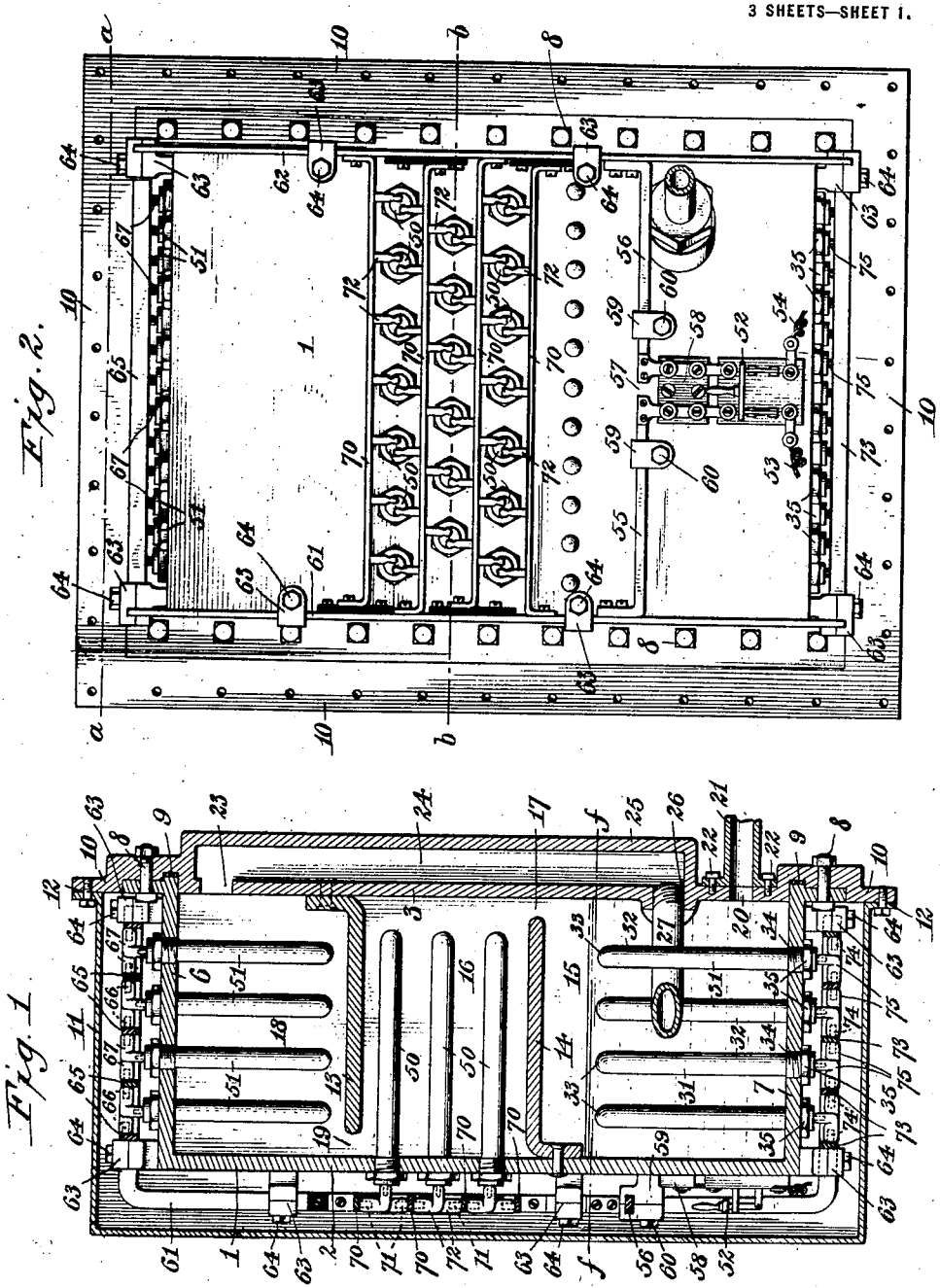

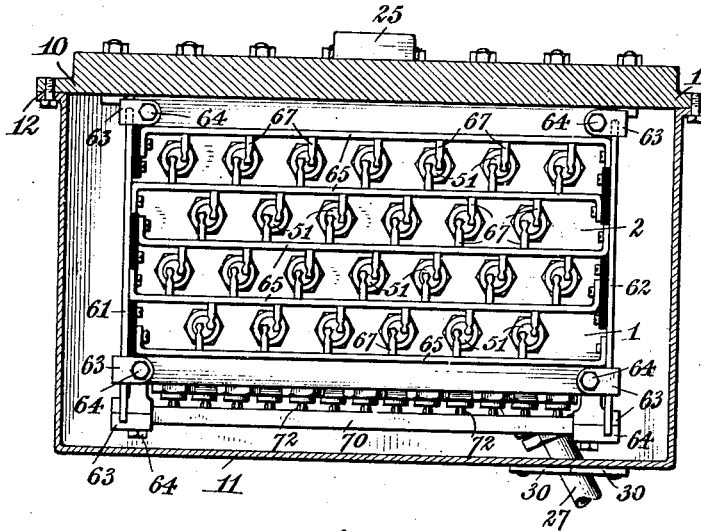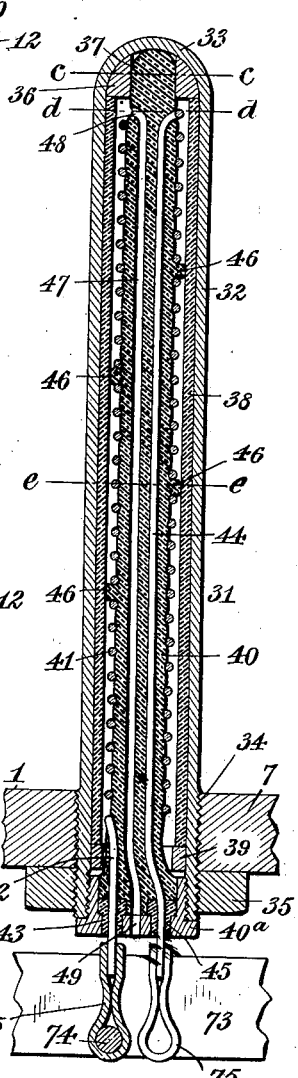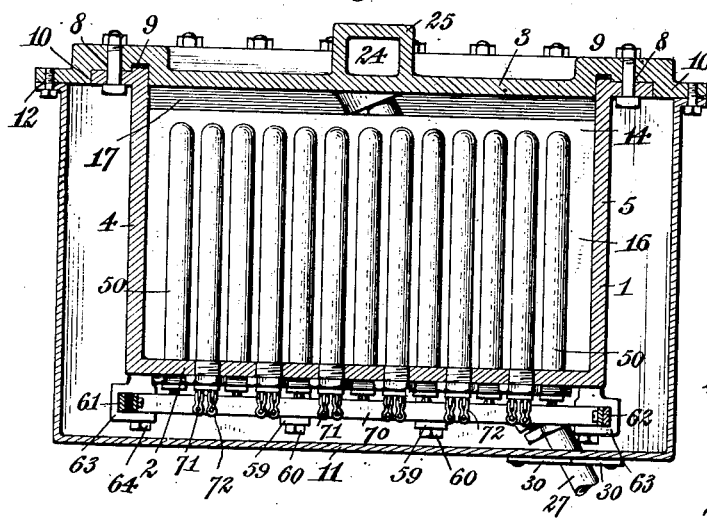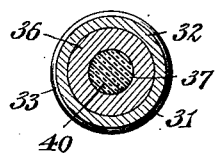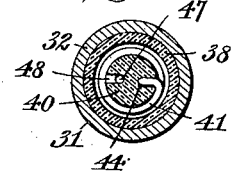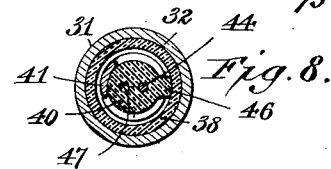

A. J. BORST, Jr.
STEAM GENERATOR AND SUPERHEATER.
APPLICATION FILED APR. 4, 1917.
1,376,509.
Patented May 3, 1921.
3 SHEETS—SHEET 3.
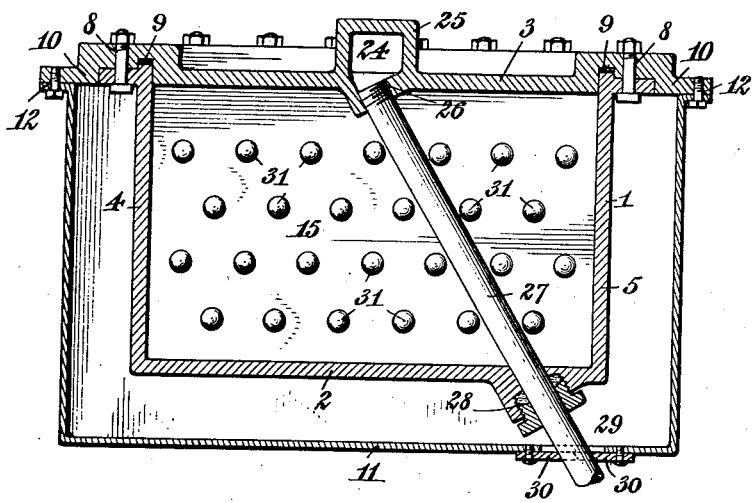
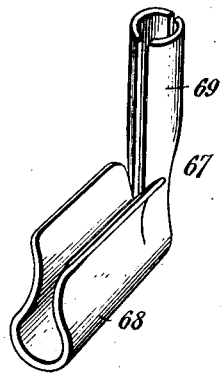
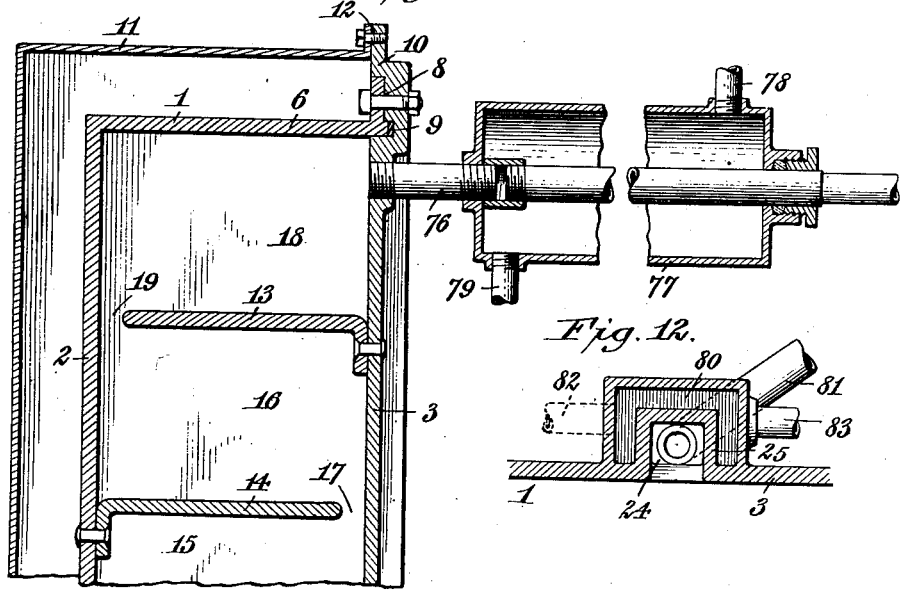
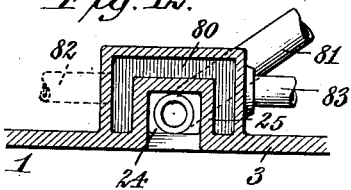

UNITED STATES PATENT OFFICE.

ANDREW J. BORST, JR., OF BUFFALO, NEW YORK.

STEAM GENERATOR AND SUPERHEATER.

1,376,509.  Specification of Letters Patent.  Patented May 3, 1921.

Application filed April 4, 1917. Serial No. 159,764.

*To all whom it may concern:*

Be it known that I, ANDREW J. BORST, Jr., a citizen of the United States, residing at Buffalo, in the county of Erie and State of New York, have invented certain new and useful Improvements in Steam Generators and Superheaters, of which the following is a specification.

My invention relates to an electrical steam generator and superheater.

The primary object of my invention is to produce a steam generator in which electric current is utilized as the heating medium; combined with a steam superheater in which the steam is adapted for passing contact with electrically heated surfaces, so as to superheat the steam and render the same more effective for power purposes.

Another object of my invention is the production of a combined electrical steam generator and superheater divided to provide a steam generating portion and a steam superheating portion connected with said steam generating portion and itself having a plurality of chambers or passages, one of which leads to said steam generating portion and has connection with another by means of a passage arranged in staggered relation to the passage from said steam generating portion.

Another object of my invention is the provision of an apparatus of the type above mentioned, which may also be termed an apparatus for generating a power medium and wherein any one of several kinds of liquids may be vaporized and the vapor superheated, and in which when, for instance, converting water to steam the steam may be superheated and developed to an exceedingly high pressure.

Another object is to provide a steam generator and superheater of this type, or either of them, in which a series of electrical heating units are employed and wherein provision is made for quickly and conveniently cutting out any one or more of said heating units from the electric circuit supplying current to the apparatus.

Another object of my invention is the production of an apparatus of the kind mentioned, which is simple in construction, comparatively inexpensive, economical in the consumption of current, and exceedingly convenient so that it may be placed under control of inexperienced persons.

With these and other objects in view, the invention consists in a combined electrical steam generator or vaporizer and superheater, by the use of which steam or other power mediums may be developed to an exceedingly high pressure.

It also consists in a steam generator or vaporizer and superheater arranged as two communicating members and in each of which a plurality of electrical heating units is arranged, the units of which are electrically connected so that each may be independently cut out of circuit.

It further consists in a combined steam generator or vaporizer and superheater in which the generator or vaporizer portion is connected to the superheater, and in which the superheater is arranged in a plurality of connected chambers or passages having the connections to said chambers or passages in staggered relation, each of said chambers or passages having a plurality of electrical heating units therein for superheating the steam or other vaporized power medium as it passes therethrough.

It further consists in the novel features of construction and in the arrangement and combination of parts to be hereinafter described and particularly pointed out in the subjoined claims.

In practice I have found that an electrical steam generator or vaporizer, when combined with my improved electrical superheater in communication with said steam generator or vaporizer, will enable me to superheat the vapor or steam from said generator or vaporizer to a pressure far beyond that otherwise obtainable in an apparatus of this type. The means employed for this purpose is illustrated in a representative manner in the accompanying drawings in which, Figure 1 is a central vertical section through a combined generator or vaporizer and superheater constructed in accordance with my invention.

Fig. 2 is a front elevation of the same with the outer protective casing removed.

Fig. 3 is a horizontal section taken on line *a—a*, Fig. 2, the outer hood or casing being secured in place.

Fig. 4 is a horizontal section taken on line *b—b*, Fig. 2.

Fig. 5 is a longitudinal section through one of the heating units, the same being shown secured to the shell or casing of the apparatus and having electrical connection with the bus-bar coöperating therewith.

Fig. 6 is a transverse section through the heating unit taken on line c—c, Fig. 5.

Figs. 7 and 8 are similar sections taken on line d—d, and e—e, respectively, Fig. 5.

Fig. 9 is a horizontal section taken on line f—f, Fig. 1, the parts attached to the exterior of the shell or casing being omitted.

Fig. 10 is a perspective view of one of the detachable connector clips whereby the heating units are electrically connected with the bus-bars.

Fig. 11 is a central vertical section through the upper portion of a shell or casing having a modified form of pressure equalizing attachment applied thereto, the heating units attached to the shell and the electrical parts coöperating with said units being omitted.

Fig. 12 is a horizontal section through a portion of the rear wall of a shell or casing, showing a still further modified form of pressure equalizer.

Similar numerals of reference refer to similar parts throughout the several views of the drawings.

In the embodiment of the invention represented in the drawings there is shown a steam-tight shell or casing 1 which, with the parts connected thereto, may be termed a "boiler." In this embodiment said shell or casing is of rectangular formation and comprises a front wall 2, a rear wall 3, side walls 4, 5, a top wall 6, and a bottom wall 7; the shell being preferably cast in one integral piece with the exception of the rear wall 3, which is bolted thereto, as shown at 8, suitable packing 9 being interposed between the rear wall and the rear edge of the major portion of the shell or casing to assure a steam-tight connection between the two parts. The rear wall 3 is extended beyond the side walls and also beyond the top and bottom walls, as at 10, and to these extending portions an outer casing or hood 11 is bolted, as at 12, said casing or hood being spaced from the shell or casing 1 for the purpose of providing the necessary space for various projecting parts on said shell or casing.

The shell or casing 1 is divided interiorly into a plurality of chambers. In the drawings I have shown three chambers separated by horizontal walls or partitions 13, 14, one of said partitions being secured to the front wall 2 of the shell or casing, and the other to the rear wall. These partitions or walls 13, 14, are therefore arranged so that the lower chamber 15 is in communication with the intermediate chamber 16 through the medium of a pasage 17 between the rear edge of the lower partition or wall 14 and the rear wall 3 of the shell or casing, said intermediate chamber 16 being in communication with the upper chamber 18 through the medium of a passage 19 arranged between the front edge of the upper partition or wall 13 and the front wall 2 of said shell or casing. These chambers are therefore connected by staggered passages.

The rear wall of the shell or casing is provided with an inlet opening 20 to which an inlet water pipe 21 is connected by means of bolts 22 threaded into said rear wall. The upper chamber 18 is provided with a steam outlet opening 23, and in the preferred embodiment of my invention I provide an elongated chamber or passage 24 which is cast into a vertically-disposed extension 25 forming part of the rear wall 3. Said rear wall 3 has a tapped opening 26 which is arranged at the lower end of the vertically-disposed passage 24, and into this opening is threaded a pipe 27 which extends obliquely through the lower chamber 15, a stuffing box 28 being provided in the front wall of the shell or casing 1 for the purpose of preventing leakage of water from the lower chamber 15 along said pipe 27. This pipe also extends through an opening 29 in the hood or outer casing 11. In order to permit the ready removal of said hood from the shell or casing, said opening 27 is somewhat larger than the diameter of the pipe; and in order to fully close the opening, two lids 30 are provided which have substantially semi-circular notches and which are secured to the hood or outer casing 11 and bear against the pipe 27, as best shown in Fig. 9.

The chamber 15 contains the desired quantity of water, or other liquid, the level of which may be maintained in any suitable manner; and, if desired, the chamber 15 may be provided with a water gage of any approved construction to indicate the height of the water or other liquid. This chamber 15 may be termed a steam generator or vaporizer, and for the purpose of heating the water or the like I have provided a plurality of electrical heating units 31 which are secured into the lower wall 7 of the shell or casing and project inwardly and outwardly therefrom with the major portion thereof projecting inwardly.

Each of said heating units comprises an elongated tube 32 closed at its upper end, as at 33, and having its lower open end provided with external screw threads 34 by means of which it is threaded into tapped openings in the lower wall 7 of said shell or casing. A nut 35 is threaded onto the portion of the tube projecting through said lower wall 7 and fastens the tube securely in place.

Fitting into the tube at the closed end thereof, is a steel or other metallic ring 36 having a central opening 37 therein. Lining the tube 32 is a sleeve of insulating material 38 which extends to a point near the lower or open end thereof, and at this point a steel or other metallic ring 39 is fitted into the tube so as to prevent lengthwise movement of said insulating sleeve.

Arranged centrally within the heating unit is a combined core and resistance-wire support 40 which is constructed of fire-brick, clay, or other suitable insulating material, and the upper end thereof is of a size to fit into the opening 37 of the metallic ring 36. This combined core and resistance-wire support has secured to its lower end a gland 40$^a$ which is externally threaded and fits into the internally threaded lower end of the tube 32. Surrounding the combined core and resistance-wire support is a resistance coil 41, one end of said coil being passed through the combined core and support near its lower end, as at 42, and passing through an insulating bushing 43 in the gland 40$^a$. The other end of said coil is continued from a point near the upper end of the combined core and support downwardly through the latter, as at 44, and extends out through the gland 40$^a$, an insulating bushing 45 being provided in the gland through which the wire is passed. I wish to state that the straight portion 44 of the resistance-wire which passes downwardly through the combined core and support is of somewhat greater diameter than the coil portion of the wire so that the wire will not heat within the core, and the coil proper which surrounds the core will be the heating medium with the amperage carried.

In order to prevent warping of the core, it is provided at intervals with projections 46 which contact with the insulating lining 38, as clearly shown in Fig. 5. The core is also provided with an elongated air-vent passage 47 which opens into the tube at the upper end thereof, as at 48, and also communicates at its lower end with a passage 49 formed in the gland 40$^a$.

When electric current is passed through the heating units 31 in the steam generator, the water or other liquid in the latter is heated to generate steam or vapor, which steam or vapor rises and passes upwardly through the passage 17 into the central chamber 16, which is one of the superheating chambers of my apparatus.

For the purpose of superheating the steam entering the chamber 16 I have arranged a series of horizontally-disposed heating units 50 within this chamber, which are constructed like those employed in the steam generating chamber and are threaded into the front wall 2 of the shell or casing. The steam passing through this chamber is superheated by the heating units 50 and passes upwardly through the passage 19 into the upper chamber 18, which is also a superheating chamber and from which, in the construction shown, the superheated steam escapes through the opening 23 in the rear wall of the shell or casing. In this second superheating chamber I have provided a series of depending heating units 51 which are of the same construction as the heating units in the superheating chamber 15. The heating units 51 are secured in the top wall 6 of the shell or casing and are so arranged that the superheated steam passing through said second superheating chamber comes in contact with these heating units and is further superheated before escaping from the shell or casing. It is of course understood that the two terminals of the electric resistance-wires of all the heating units must be electrically connected so that they are properly heated. Attention is invited to the fact that the heating units are arranged in staggered relation in all of the chambers of the apparatus, particularly in the superheating portions so that the steam or superheated steam in passing through the superheating chambers or passages is brought into intimate contact with these heating units.

On the front wall 2 of the shell or casing I have arranged a two-blade knife switch 52, one of the blades of which is connected with the positive wire 53 of an electric circuit and the other with the negative wire 54 of such circuit. This knife blade switch is adapted to make connection with two electric feed bars 55, 56 which are separated from each other, as at 57, and between which and the switch the usual fuse block 58 is interposed. These bars 55, 56 which are, respectively, the positive and negative feed bars, are secured in insulation blocks 59 fastened to the front wall of the shell or casing by bolts 60.

61, 62 are copper or other electrical feed bars which are arranged at opposite sides of the shell or casing 1 and extend forward from a point near the rear wall above the top of the shell or casing, thence downwardly in a plane in front of the front wall of said casing, and thence rearwardly in a plane beneath the lower wall of the shell or casing to a point near the rear wall thereof. These feed bars are respectively the positive and negative feed bars of the circuit. Each of these feed wires is secured in place by insulation blocks 63 which are fastened to the top, front and bottom walls of the shell or casing by means of bolts 64.

For electrically connecting the terminals of the heating units in the upper superheating chamber 18 with the electric feed bars 61, 62, I have provided transversely-disposed bus-bars 65 to electrically connect the four rows of heating units. These bus-bars, five in number, are alternately connected with the opposite feed bars 61, 62, as clearly shown in Fig. 3, the rearmost bus-bar being electrically connected with the negative feed bar 62 and insulated from the positive feed bar 61. This is also true of the central and the foremost bar, while the second and fourth bars are electrically connected with the positive feed bar 61 and insulated from the negative feed bar 62.

Each of the bus-bars is provided with one or more series of contact pins 66, the foremost and rearmost bars, however, having only a single series, while each of the intermediate bars have two series extending in opposite directions from the bar. These contact pins have connection clips 67 clamped thereon, each clip being provided with a horizontal portion 68 adapted to clamp over one of the contact pins 66, and with a vertical portion 69 adapted to clamp onto one of the terminals of the electric resistance-wire of the coöperating heating unit. The rearmost bus-bar furnishes the electric current from the negative feed bar 62 to one of the terminals of each of the heating units constituting the rear row, while the next adjacent bar is connected to the positive feed bar 61, and through the medium of the contact pins 66 and clips 67 the two rows of heating units in front and rear of the same are electrically connected, this arrangement being carried out for all the heating units of the upper superheating chamber.

The feed bars 61, 62 are also provided with transversely-disposed bus-bars 70 which are equipped with contact pins 71 and connector clips 72 whereby these bus-bars are electrically connected with the heating units 50 in the superheating chamber 16. These bus-bars are alternately connected with the positive and negative feed bars 61, 62, as described with reference to the bus-bars 65, and they are therefore insulated from said feed bars in the same manner as the bus-bars 65.

Beneath the shell or casing 1 is a series of bus-bars 73 electrically connected and also insulated from the positive and negative feed bars 61, 62, in the same manner as those provided for the heating units in the two superheating chambers; each of these bus-bars being provided with contact pins 74 and connector clips 75 for connecting the terminals of the heating units 31 in the generating chamber 15.

When the switch 52 is closed, the current from the positive feed wire 53 passes through the fuse block; the horizontal positive feed bar 55 and the positive vertically-disposed feed bar 61. From the latter it passes through the various bus-bars 65, 70 and 73 electrically connected therewith; thence through the contact pins of said bars; the connecting clips attached to said pins, the resistance-wires within all the heating units; from the resistance-wires to the connecting clips 67 fastened to the bus-bars 65, 70 and 73 which are electrically connected with the negative vertically-disposed feed bar 62, and from the latter through the horizontal negative feed bar 56; through the fuse and switch to the negative feed wire 54, thus completing the circuit and thoroughly heating all the heating units within the apparatus.

By providing the individual connecting clips for each heating unit, any number of heating units may be cut out of circuit, as it is simply necessary to disengage these connecting clips from the contact pins of the bus-bars and the terminals of the heating units.

When the water within the steam generating chamber, or what may be termed the boiler proper, is heated to pass off vapor or steam, the vapor or steam passes up through the upper portion of the shell or casing in a circuitous path and in intimate contact with the heating units in said upper portion. In practice it has been found that an exceedingly high pressure is obtained by thus electrically heating or superheating the steam, and due to this exceedingly high pressure the walls of the shell or casing 1 are made quite heavy and, if desired, may be entirely bound with piano wire suitably coiled around the shell or casing.

It is of course understood that the superheating compartments may be increased in number and each of the compartments heated in the manner described, and it is apparent that in such case the compartments will be further separated by baffle walls or partitions 13 so as to continue the circuitous travel of the steam or superheated steam through the additional compartments. Where, however, the size of the apparatus is a consideration, it may be found necessary to confine the apparatus to a single superheating compartment or, at the most, to two superheating compartments, as shown in the drawings, but it has been found in practice that where the steam is not given the necessary length or range of travel in contact with the heating units, it is not always evenly superheated, and that when running an engine with steam thus superheated there is a possibility of the engine "lagging," due to the fact that the pressure of the superheated steam is not equalized prior to entering the engine. For the purpose of equalizing the pressure of the superheated steam, it is passed downwardly through the passage 24 in the rear wall 3 of the shell or casing and thence through the pipe 27 which is passed directly through the boiling water within the steam generator or boiler proper. The steam in passing through the pipe surrounded by the boiling water is equalized and enters the engine with a constant pressure at all times. This is a very important feature of my invention when the space allotted for the apparatus will not permit the use of the required number of superheating chambers, or "passages," which the chambers 16 and 18 may be termed. For example, when using an apparatus of this kind in an automobile, the apparatus is necessarily limited to a certain size, and under such conditions the equalizing of the superheated steam by passing the same through a passage surrounded by heat is of vital importance.

In Fig. 11 I have shown a modification in which an outlet pipe 76 is threaded into the rear wall of the shell or casing at the uppermost superheating chamber or passage, this pipe being passed through a hot water drum 77, through which hot water may be passed by introducing the same through a pipe 78 and permitting the water to escape therefrom through a pipe 79.

A further modification is shown in Fig. 12, in which the vertical superheated steam passage 24 is surrounded by a hot water jacket 80. The steam to be utilized escapes through a pipe 81 while the hot water or other heating medium may be introduced into the jacket 80 through a pipe 82, shown in dotted lines, and permitted to escape through a pipe 83.

It is further to be understood that where a number of superheating chambers or passages are sufficient to superheat the steam so that it escapes at all times from the apparatus under even pressure, a pipe may be connected directly with the superheating portion of the apparatus to be led to the engine, or to any point for the use desired.

This invention is susceptible to various changes and modifications, and it is to be understood that certain features thereof may be utilized without combining the same with other features described and illustrated; also that the appended claims are to be given the broadest interpretation possible by the prior art.

Having thus described my invention, what I claim is—

1. An apparatus of the kind described comprising a casing divided to form a boiler and a superheating chamber, said boiler and chamber being in communication, and electrical heating means within said boiler and said superheating chamber, a portion of said electrical heating means being arranged at right angles to the path of travel of the steam through said casing.

2. In an apparatus of the kind described, in combination, an electrical boiler having a liquid inlet and being supplied with liquid to be heated, a superheating chamber connected with said boiler and having an outlet for the superheated steam or vapor, and means for conducting the superheated steam or vapor from said outlet through the heated water in said boiler.

3. In an apparatus of the kind described, in combination, a boiler having electrical heating elements, a superheating chamber in communication with said boiler and provided with electrical heating elements, and a conduit passing through the liquid in said boiler and having connection with said superheater whereby the superheated steam is subjected to the lower but even temperature of the liquid within said boiler.

4. In an apparatus of the kind described, a unitary structure in the form of a casing of even dimensions in width and depth from top to bottom and being divided into two portions, each portion being equipped with electrical heating means, a liquid supply for one of said portions and a steam vapor outlet for the other portion whereby the steam or vapor generated in one portion is caused to travel through the other and be superheated by the electrical heating means therein.

5. In an apparatus of the kind described, a casing provided with a plurality of partition walls, a steam generating portion at one side of one of said walls and a superheating portion at the other side of said wall, said steam generating portion being subdivided by the remaining partition wall or walls, a passage at one end of each of said walls, said passages being arranged in staggered relation, and electrical heating means in the steam generating portion and in each of the subdivisions of said superheating portion.

6. An apparatus of the kind described, comprising a casing having a steam generating chamber at its lower end and a superheating chamber at its upper end, said superheating chamber being in communication with said steam generating chamber and having a divisional wall therein to form a circuitous passage therethrough, upstanding electrical units in the steam generating chamber, horizontally-disposed heating units in the portion of the superheating chamber beneath said divisional wall, and depending heating units in the portion of the superheating chamber above said divisional wall.

7. In an apparatus of the kind described, a casing provided with two horizontal partition walls, one of which is secured to the front wall of the casing and has its rear edge spaced from the rear wall of the casing, the other being secured to the rear wall of the casing and having its front edge spaced from the front wall of the casing, horizontally-disposed heating tubes supported by the front wall of said casing and extending inwardly between said partition walls, electrical heating tubes secured in the top wall of the casing and depending therefrom, electrical tubes secured in the bottom wall of the casing and extending upwardly therefrom, means for feeding water into the casing below the lower partition wall, and a superheated steam outlet in the rear wall of the casing above the upper partition wall.

8. In an apparatus of the kind described, the combination of a casing divided to provide a boiler in one portion thereof and a superheater in the other portion thereof, said superheater being subdivided to form a circuitous passage therethrough, electrical heating units in said circuitous passage arranged with the heating units in one portion of the passage at right angles to those in the other, electrical heating units in the boiler portion of said casing, a liquid feed pipe connected to said boiler portion, and a superheated steam outlet connected to the end of said circuitous passage distant from said boiler portion.

9. The combination of a boiler having heating means, and a superheating chamber connected with said boiler and divided to form a circuitous passage therethrough, each portion of said passage having electrical heating units therein, a portion at least of which units are arranged at right angles to the path of travel of the steam therethrough.

10. An apparatus of the kind described, comprising a casing divided to form a boiler and a superheating chamber, said boiler and chamber being in communication, electrical heating tubes within said superheating chamber, electric feed bars common to all of said heating tubes, and means for individually connecting said heating tubes with or disconnecting the same from said electric feed bars.

11. An apparatus of the kind described, comprising a casing having a series of electrical heating tubes and a series of electric superheating tubes therein, two parallel electric feed bars at opposite sides of said series of tubes, bus-bars connecting said feed bars, and means of electrically connecting said bus-bars with said electrical heating tubes.

12. An apparatus of the kind described, comprising a casing having a boiler at its lower end and a superheating chamber at its upper end, electrical heating tubes secured in the top wall of said casing, upstanding electrical heating tubes secured in the bottom wall of said casing, a pair of spaced feed bars at opposite sides of said casing and insulated therefrom, bus-bars connecting said feed bars at the top and bottom of said casing, and means for individually connecting each of the heating tubes in said boiler and superheating chamber with one of said bus-bars.

13. In an apparatus of the kind described, the combination of a casing divided to form a boiler and a superheater above said boiler, parallel rows of electrical heating tubes secured to the top wall of said casing and depending into said superheating chamber, parallel rows of electrical heating tubes secured to the front wall of said casing and extending horizontally into said superheating chamber, parallel rows of electrical heating tubes secured to the bottom wall of said casing and extending upwardly into the boiler of said casing, a negative feed bar arranged at one side of the casing and having a vertical portion parallel with the front wall of the casing and two horizontal portions parallel with the top and bottom walls of the casing, a similarly shaped positive feed bar at the other side of the casing, bus-bars connecting the negative and positive feed bars at the top, front and bottom of the casing in planes between which said electrical heating tubes are arranged, said bus-bars at the top, the front and the bottom of the casing being insulated alternately from said negative feed bar and from said positive feed bar, and means for electrically connecting said electrical heating tubes in parallel with said bus bars.

14. In an apparatus of the kind described, the combination of a casing, heating tubes secured in parallel rows within one of the walls of said casing and projecting into the casing and also outwardly therefrom, each heating tube having an electric resistance-wire with projecting exterior terminals, electric feed bars arranged at opposite sides of each row of said heating tubes, and detachable connector clips connecting said feed bars with the terminals of said heating tubes.

15. In an apparatus of the kind described, the combination with a casing having a plurality of parallel rows of electric heating units secured in one of the walls thereof and projecting outwardly and inwardly therefrom with the major portion thereof projecting inwardly, each heating tube having an electric resistance-wire with outwardly projecting terminals, parallel feed bars arranged at right angles to the rows of heating tubes, and bus-bars connecting said feed bars and arranged parallel with said rows of heating tubes and at opposite sides of each row of tubes, said bus-bars being alternately insulated from opposite feed bars, and means for electrically connecting said bus-bars with the terminals of said electric resistance-wires.

16. In an apparatus of the kind described, the combination of a casing having an outstanding flange at its rear end, a boiler formed in its lower portion, a superheater formed in its upper portion in communication with said boiler, electrical heating units for said boiler and for said superheating portion, each unit projecting outwardly through one of the walls of said casing, means for electrically connecting said units in parallel rows, said means being supported on the exterior surface of said casing, and a hood inclosing said casing and spaced therefrom, said hood being secured to the outstanding flange of said casing.

17. In an apparatus of the kind described, the combination of a casing having parallel rows of heating units secured in one of the walls only of said casing and projecting outwardly and inwardly therefrom with the major portion thereof projecting inwardly and having its inner end free, the tubes of alternate rows being disposed in different planes, and means for electrically connecting said tubes.

18. In an apparatus of the kind described, a unitary structure in the form of a rectangular casing having a horizontal divisional wall provided with an opening and having the space below said divisional wall serving as a boiler and the space above the same as a superheater, and electrical heating means within both spaces, the space beneath said divisional wall being adapted to receive water to generate steam to be superheated in the space above said divisional wall.

In testimony whereof I affix my signature.

ANDREW J. BORST, Jr.